Patented Dec. 24, 1940

2,226,030

UNITED STATES PATENT OFFICE 2,226,030

PAINT AND PROCESS FOR MAKING SAME

Ernest A. Troeger, Brooklyn, N. Y., assignor to James H. Gilvarry, Brooklyn, N. Y.

No Drawing. Application September 7, 1939, Serial No. 293,661

2 Claims. (Cl. 134—55)

This invention relates to an improved paint and the process for making the same.

Among the objects of the present invention it is aimed to provide an improved paint using as a plasticizer a by-product today practically useless to wit: the residue by-product remaining in the refining of sugar cane after the removal of the sugar, molasses, fibers and the like. This residue known as blackstrap is today practically useless except for manufacturing a very low grade rum.

It has been found as an instance that this waste by-product blackstrap can be used to advantage as a plasticizer in the manufacture of paint when associated with glue, whiting, hydrated lime, Alberene sawdust commonly known as soap stone, and formaldehyde. When it is desired to produce a paint other than white, there is generally added the well known vegetable, animal or mineral coloring substances such as indigo, carmine or vermillion.

The glue used in the aforesaid formula serves as a binder, the whiting and hydrated lime serve as a filler one supplementing the other and varying relative to one another according to the fluidity required, the percentage of hydrated lime being greater when the resulting mixture is to be less fluid. The soap stone or Alberene sawdust serves as a finishing product to produce a smooth surface finish. The formaldehyde supplements the hydrated lime in serving as a germicide or insecticide to eliminate vermin, fungus growth and the like. It is of course also obvious that the formaldehyde cooperates with the glue to render the glue insoluble in water.

It is of course obvious that many equivalents for the aforesaid elements added to the blackstrap may be substituted without departing from the general spirit of the invention, as an instance kaolin or china clay may be substituted for whiting and lithophone may be substituted for the soap stone.

More specifically the process consists in adding to the residue blackstrap in the proportion of about three ounces to a predetermined ultimate quantity of about three ounces of glue, eighteen ounces of whiting, twenty-four ounces of hydrated lime, five ounces of soap stone and a one-half ounce of formaldehyde. In carrying out this process excellent results have been produced when three ounces of glue have been dissolved in forty-eight ounces of water boiled at about 230° Fahrenheit until properly dissolved when the remaining ingredients aforesaid were stirred into the liquid so produced one after the other in the order named to wit: blackstrap, whiting, hydrated lime, soap stone and formaldehyde and then the ingredients so added thoroughly mixed. The container or mixer is preferably of the double cooker type today extensively used.

While applicant does not intend to be limited to the chemical formulae under which these several substances are generally known, in an effort to clearly present the same, attention is called to the fact that the blackstrap is generally believed to be a tri-basic saccharate of calcium known under the formula $C_{12}H_{22}O_{11}3(CaO)$; that the whiting is generally known under the chemical formula $Ca(CO_3)$; that the hydrated lime is generally known under the chemical formula $CaO$; that the soap stone is generally known under the chemical formula $H_2Mg_3(SiO_3)_4$; and that the formaldehyde is generally known under the chemical formula $HC(OH)$.

In carrying out this invention while any suitable gelatine may be used in place of the glue the best results have so far been achieved when animal glue was used.

The present improved paint is characterized by the fact that due to the use as an instance of the otherwise practically valueless blackstrap, a comparatively cheap paint can be produced and this by-product now used to advantage thereby eliminating the cost of discarding the blackstrap as heretofore and eliminating the cost of an otherwise valuable substitute for this heretofore practically valueless by-product blackstrap.

The paint produced according to the present invention has great spreading power and durability, is suitable for producing a dull finish or stipple finish, will not blister or peel, is practically immune to fading, needs no undercoating or sizing when first applied to a raw wood, new wood, plaster or the like base, has no odor while being applied or after it is dry and is practically non-combustible.

By the term "blackstrap" used throughout the specification and claims, applicant refers to the by-product, in the manufacture of rum from molasses or mash sugar, as it is today conventionally practiced, which by-product is now generally discarded after the final or fifth distillation or cooking of the sugar mash or molasses.

It is obvious that various changes and modifications may be made to the steps of the process and in the details of the paint constituting the present invention without departing from the general spirit thereof set forth in the appended claims.

I claim:

1. A paint composed of substantially three parts of blackstrap, substantially three parts of glue, substantially eighteen parts of whiting, substantially twenty-four parts of hydrated lime, substantially five parts of soap stone and substantially one-half part of formaldehyde.

2. The process of making paint consisting in mixing three ounces of glue with forty-eight ounces of water, boiling the mixture to at least 230° Fahrenheit until thoroughly dissolved and then stirring into the thus formed mixture three ounces of blackstrap, eighteen ounces of whiting, twenty-four ounces of hydrated lime, five ounces of soap stone and a one-half ounce of formaldehyde and a color substance.

ERNEST A. TROEGER.